Sept. 18, 1928.
F. N. DRAPER
1,684,695
LIGHTING DEVICE FOR VEHICLES
Filed Aug. 2, 1926     2 Sheets-Sheet 1
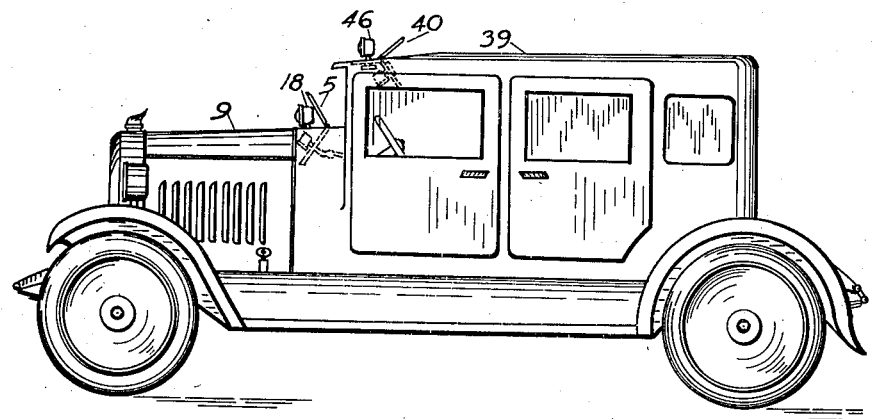
Fig. 1
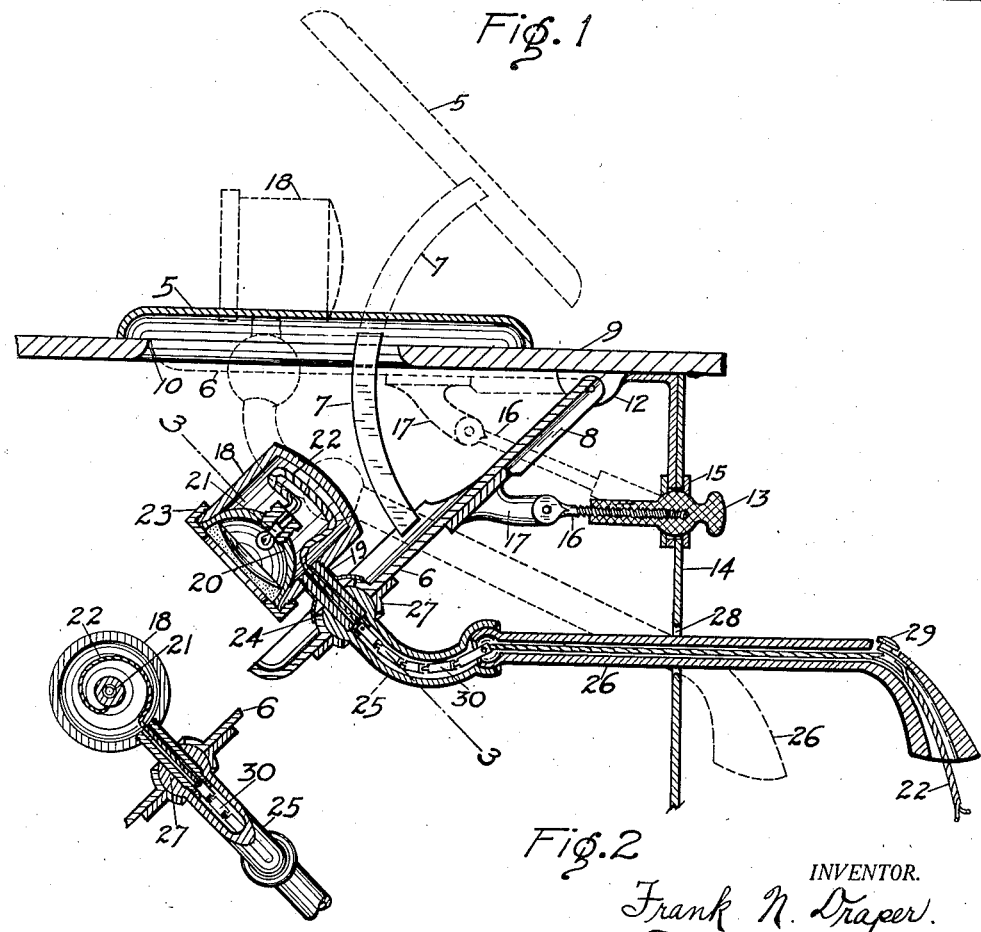
Fig. 2
Fig. 3
INVENTOR.
Frank N. Draper.
BY
ATTORNEY.

Sept. 18, 1928.
F. N. DRAPER
1,684,695
LIGHTING DEVICE FOR VEHICLES
Filed Aug. 2, 1926
2 Sheets-Sheet 2
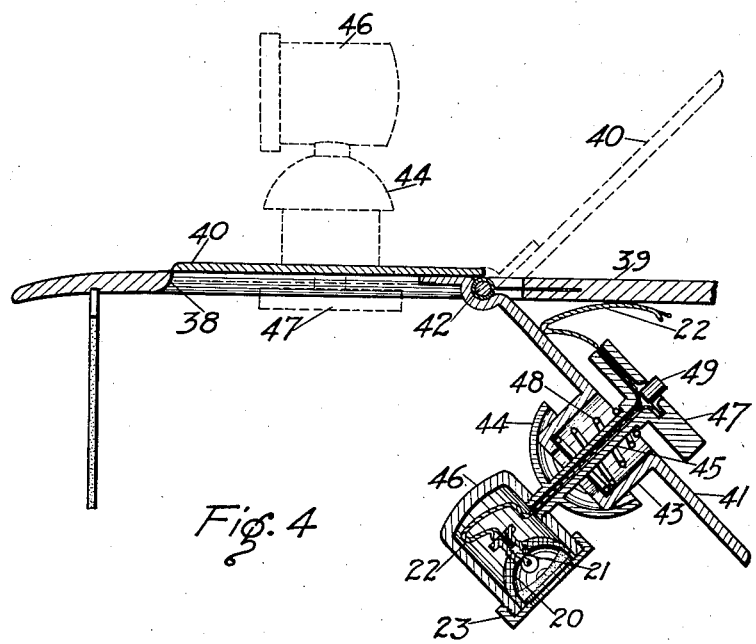
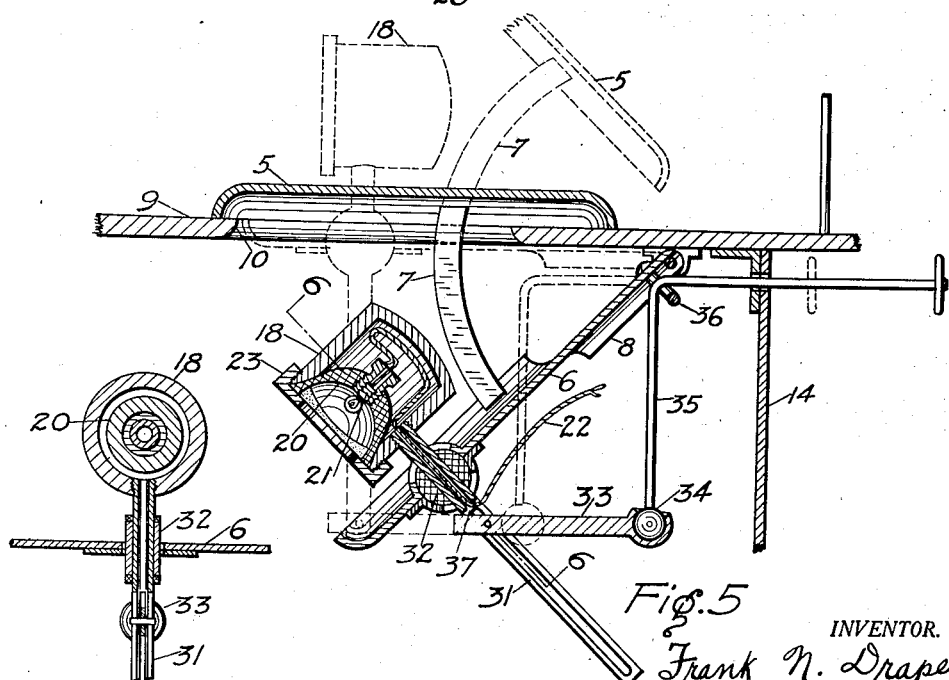
INVENTOR.
Frank N. Draper.
BY
ATTORNEY.

Patented Sept. 18, 1928.

1,684,695

UNITED STATES PATENT OFFICE.

FRANK N. DRAPER, OF DENVER, COLORADO.

LIGHTING DEVICE FOR VEHICLES.

Application filed August 2, 1926. Serial No. 126,591.

My invention relates to lighting devices for motor driven vehicles and more particularly to an adjustable lighting device of the type commonly known as "spotlights".

It is an object of the present invention to provide a light of the above described character which when not in use may be retracted through an opening of the part of an automobile on which it is mounted, in connection with a support by which the opening is closed.

Another object of the invention is to mount the light in combination with a ventilator-shutter of a motor vehicle. A further object is to construct the light so that it may be partially dismounted from its support and used as a "trouble light" to illuminate different parts of the vehicle for the purpose of adjustments or repairs, and still other objects reside in details of construction and a novel arrangement of parts as will fully appear in the course of the following description.

In the accompanying drawings in the several views of which like parts are similarly designated, Figure 1 represents a side elevation of a motor vehicle showing my improved illuminating device in two different positions, Figure 2, an enlarged vertical section of the lighting device in connection with a support adapted to cover a ventilating opening in the cowl of an automobile, Figure 3, a section on the line 3—3 Figure 2, Figure 4, a sectional elevation showing the light as it is mounted on a support covering a ventilating opening in the top of an automobile of the enclosed type, Figure 5, a similar view showing a modification of the construction illustrated in Figure 2, and Figure 6, a section taken on the line 6—6 Figure 5.

Referring first to Figures 2 and 3 of the drawings, the support for the spot light comprises two plate-members 5 and 6 fastened together at an acute angle to each other by means of a rigid brace 7. The two plates are concaved to provide a marginal flange for engagement with the part to which the support is applied, at opposite sides of the opening hereinafter described and one of them has an extension 8 for its hinged connection with the part.

The part above referred to is in this instance the cowl 9 of an automobile, which has a ventilating opening 10 adapted to be closed by either of the two plates of which the lamp-support is composed.

The support is by means of its extension, hinged to a lug 12 on the underside of the cowl and it is connected with a suitable adjusting mechanism for its movement to different positions at the will of the driver of the vehicle.

The adjusting means as shown in Figure 2, comprises a sleeve-nut 13 mounted in an opening of the dash board 14 of the vehicle by means of a ball-and-socket joint 15, and a screw threaded link 16 cooperating with the nut, in pivotal connection with a lug 17 on the underside of the plate 6. The members of the support are positioned at opposite sides of the opening in the cowl so that either of them may close the opening in an extreme position, while in another position they may open the same, it being understood that the various adjustments of the support are readily made by rotation of the sleeve-nut 13.

The spot light is mounted on the inner and lower plate of the support in such a manner that it may be rotated in two planes at right angles to each other. The light comprises a casing 18 provided with a hollow stem 19 and open at one side to receive the lamp proper which, in the form shown in the drawing, consists of a reflector 20 and an incandescent bulb 21, the wires 22 of which pass through the hollow stem.

The lamp is held in place by a retaining rim 23 screwed on the casing, and it has sufficient wire within the casing to permit of its being moved away therefrom for use as a trouble lamp after the ring has been detached. The casing is tiltably supported on the plate by means of a ball-and-socket joint 24 and its stem is rotatably fitted in the end of an operating handle which consists of two jointed parts 25 and 26 one of which has a pivotal connection with the lamp-support as at 27, while the other is rotatable in an opening of the dash board 28 of the vehicle.

The two members of the handle are hollow to receive the lamp wires and the member 26 carries a switch 29 by which the circuit of the lamp is controlled. The member 26 of the handle is connected with the stem of the casing by a flexible shaft 30 within the other member, for the purpose of turning the stem about its axis when it is desired to point the face of the lamp in different directions.

The device has been shown in full lines in Figure 2, in the position in which the lamp is concealed within the cowl and the upper plate of the support covers the ventilator opening of the same. In the broken line position, the lamp extends above the cowl for use as a spot light and the inner plate closes the opening 10 and it will be understood without further illustration that in intermediate positions both plates of the support may be separated from the opening for ventilating purposes.

The adjustment of the hinged support is readily accomplished by rotation of the nut 13 and the lamp may be tilted up or downwardly or turned about the axis of its stem by means of the jointed handle.

In the modified construction illustrated in Figures 5 and 6, a single element is employed to adjust the position of the support and tilt or turn the lamp. The stem of the casing is in this construction elongated as at 31 to extend through and beyond a disk 32 loosely mounted in a socket of the plate 6. The extension of the stem is longitudinally slotted for its pivotal connection with a link 33 which by means of a ball-and-socket joint 34 is connected with an angular operating handle 35 extending through an opening of the dash-board.

The handle is capable of sliding lengthwise through the opening and it is connected with the lamp-support by means of an eye 36 on the inner plate of the support, through which the handle extends.

The hollow stem of the lamp-casing has an opening for the passage of the electric wires to a conveniently positioned switch not shown.

The construction illustrated in Figure 4 differs in that the lamp-support is applied to cover a ventilating-opening 38 in the top 39 of the vehicle. The support is, as in the first described form of the invention, composed of two plates 40 and 41. In the present construction, however, they are fixed together by means of an arcuate member 50, at an obtuse angle to each other to close the opening in either the operative position or the retracted position of the lamp. The support is hinged at an end of the opening, as at 42, and the lower plate has a hollow boss 43 upon which the lamp-casing is supported through the medium of an inverted hemispherical cup 44. The support is held in any desired position by means of a spring 49, which is in engagement with the arcuate member 50 at all times.

The stem 45 of the lamp-casing 46 extends below the plate 41 of the support, where it is provided with a knob 47, and a spring 48 coiled around the stem between the knob and a flange at the end of the hollow boss on the plate, functions to hold the parts adjustably in their relative positions.

The wires of the electric bulb-socket extend through the hollow stem as before, and a circuit controlling switch 49 is mounted on the knob.

It will be apparent that the position of the lighting device of the last described construction is easily adjusted by the occupants of the vehicle, any one of which may, by reaching upwardly, manipulate both the knob and the electric light switch.

The light on the cowl of the vehicle, shown in Figures 2 and 5, is adjusted by one of the occupants of the front-seat of the vehicle, who by means of the handle projecting beyond the dash-board of the vehicle, controls the position of both the support and the lamp, and also may operate the switch of the circuit in which the lamp-socket is connected.

It will be observed that the invention in either form provides a convenient means for the operation of an illuminating device as either a spotlight or a trouble lamp, in operative connection with a support which while serving in the capacity of a ventilator-shutter, permits of moving the device to either an exposed position or a retracted and concealed position.

Variations in the construction of the adjusting means and other parts of the lamp and its supporting means, other than those shown and herein described, may be resorted to within the spirit of the invention as defined in the hereunto appended claims.

What I claim and desire to secure by Letters Patent is:—

1. A disappearing automobile light comprising a light in the automobile mounted for universal movement and adapted to move through an opening in the automobile to the outside thereof, means to move the light through said opening, means in the automobile for the universal movement of said light, and means closing the opening when the light is inside or outside of the automobile.

2. A disappearing automobile light comprising a light in the automobile mounted for universal movement and adapted to move through an opening in the automobile to the outside thereof, means inside of the automobile for the universal movement of said light, and means closing the opening when the light is inside or outside of the automobile.

3. A disappearing automobile light comprising a light in the automobile adapted to move through an opening in the automobile to the outside thereof, shutter means, upon which the light is mounted for universal movement, closing the opening when the light is inside or outside of the automobile, screw means in the automobile having a ball and socket connection with a relatively stationary part of the automobile and having a pivotal connection with the shutter means whereby to move the light through said opening by manipulation of the screw means, and means for the universal movement of said light.

4. A disappearing automobile light comprising a light in the automobile adapted to move through an opening in the automobile to the outside thereof, shutter means, upon which the light is mounted, a ball and socket connection between the light and the shutter means, the shutter means closing the opening when the light is inside or outside of the automobile, means to move the light through said opening, and a handle in the automobile having a ball and socket connection with the lamp for its universal movement.

5. A disappearing automobile light comprising light movable through an opening in the automobile to the outside thereof, a mounting for the light disposed to close the opening when the light is outside of the automobile, a brace on the mounting extending through the opening, and a shutter on the brace disposed to close the opening when the light is inside of the automobile, and means to move the light through the opening by moving the mounting of the light.

6. A disappearing automobile light comprising a light in the automobile adapted to move through an opening in the automobile to the outside thereof, shutter means, upon which the light is mounted closing the opening when the light is inside or outside of the automobile, and screw means in the automobile pivotally connected with a stationary part of the automobile and with the shutter means, whereby to move the light through said opening by manipulation of the screw means.

7. A disappearing automobile light comprising a light in the automobile adapted to move through an opening in the automobile to the outside thereof, shutter means, upon which the light is mounted closing the opening when the light is inside or outside of the automobile, and means in the automobile for moving the shutter means, whereby to move the light through said opening.

In testimony whereof I have affixed my signature.

FRANK N. DRAPER.